United States Patent
Seo et al.

(10) Patent No.: US 10,313,299 B2
(45) Date of Patent: Jun. 4, 2019

(54) DOMAIN NAME SYSTEM (DNS) AND DOMAIN NAME SERVICE METHOD BASED ON USER INFORMATION

(71) Applicants: Jeong Hoan Seo, Seoul (KR); Young Suk Lim, Seoul (KR)

(72) Inventors: Jeong Hoan Seo, Seoul (KR); Young Suk Lim, Seoul (KR)

( * ) Notice: Subject to any disclaimer, the term of this patent is extended or adjusted under 35 U.S.C. 154(b) by 0 days.

(21) Appl. No.: 14/375,769

(22) PCT Filed: Aug. 26, 2013

(86) PCT No.: PCT/KR2013/007638
§ 371 (c)(1),
(2) Date: Jul. 30, 2014

(87) PCT Pub. No.: WO2015/030270
PCT Pub. Date: Mar. 5, 2015

(65) Prior Publication Data
US 2016/0241508 A1    Aug. 18, 2016

(51) Int. Cl.
*G06F 15/16* (2006.01)
*H04L 29/12* (2006.01)
(Continued)

(52) U.S. Cl.
CPC ...... *H04L 61/1511* (2013.01); *G06F 16/9537* (2019.01); *H04L 61/304* (2013.01);
(Continued)

(58) Field of Classification Search
CPC . H04L 29/12066; H04L 67/101; G06F 17/22; G06F 9/505
(Continued)

(56) References Cited

U.S. PATENT DOCUMENTS 5,805,820 A * 9/1998 Bellovin ............. H04L 29/06
707/999.009
6,185,598 B1 * 2/2001 Farber ................. G06F 9/505
709/200

(Continued)

FOREIGN PATENT DOCUMENTS

CN           1525709 A     9/2004
KR    10-2004-0041389 A    5/2004
(Continued)

OTHER PUBLICATIONS

International Search Report from the International Bureau of WIPO for International Application No. PCT/KR2013/007638 dated Aug. 26, 2013 non-English (3 pages).
(Continued)

*Primary Examiner* — Douglas B Blair
(74) *Attorney, Agent, or Firm* — Fitch, Even, Tabin & Flannery LLP

(57) ABSTRACT

The present invention relates to a domain name system (DNS) and domain name service method based on user information. The DNS includes a client which outputs a domain name query including user information and service domain name information, a DNS which receives the domain name query from the client, and a database which receives the domain name query from the DNS, extracts the user information included in the domain name query, and differently provides destination path information for each set of user information, wherein the client receives destination path information for each set of user information from the database through the DNS.

10 Claims, 8 Drawing Sheets

(51) Int. Cl.
*G06F 16/9537* (2019.01)
*H04L 29/06* (2006.01)

(52) U.S. Cl.
CPC ........ *H04L 61/305* (2013.01); *H04L 61/6013* (2013.01); *H04L 63/1458* (2013.01)

(58) Field of Classification Search
USPC ................................. 709/225, 228, 242, 245
See application file for complete search history.

(56) References Cited

U.S. PATENT DOCUMENTS

| | | | | |
|---|---|---|---|---|
| 6,470,389 | B1* | 10/2002 | Chung | H04L 29/06 709/227 |
| 7,228,359 | B1* | 6/2007 | Monteiro | H04L 29/12066 709/228 |
| 7,437,364 | B1* | 10/2008 | Fredricksen | G06F 17/30011 |
| 7,565,423 | B1* | 7/2009 | Fredricksen | H04L 29/12066 709/203 |
| 7,840,699 | B2 | 11/2010 | Fujita et al. | |
| 9,106,607 | B1* | 8/2015 | Lepeska | H04L 67/2847 |
| 2004/0044791 | A1* | 3/2004 | Pouzzner | G06F 17/22 709/245 |
| 2004/0210672 | A1* | 10/2004 | Pulleyn | H04L 29/12066 709/245 |
| 2005/0027862 | A1* | 2/2005 | Nguyen | G06F 9/505 709/225 |
| 2007/0050507 | A1* | 3/2007 | Ollikainen | H04L 29/12066 709/227 |
| 2008/0101358 | A1* | 5/2008 | Van Ewijk | H04L 29/12132 370/389 |
| 2010/0186079 | A1* | 7/2010 | Nice | H04L 63/0281 726/14 |
| 2011/0038483 | A1* | 2/2011 | Goeller | H04L 41/5064 380/282 |
| 2011/0055374 | A1* | 3/2011 | Christenson | H04L 29/12066 709/224 |
| 2011/0119398 | A1* | 5/2011 | Foote | H04L 29/12066 709/238 |
| 2011/0153864 | A1* | 6/2011 | Prasad | H04L 29/12066 709/242 |
| 2013/0159499 | A1* | 6/2013 | Besehanic | H04L 61/1511 709/224 |
| 2013/0208591 | A1 | 8/2013 | Larsen et al. | |
| 2015/0229668 | A1* | 8/2015 | Boodaei | H04L 61/1511 726/22 |

FOREIGN PATENT DOCUMENTS

| | | |
|---|---|---|
| KR | 10-2005-0002292 A | 1/2005 |
| KR | 10-2005-0002337 A | 1/2005 |
| KR | 10-2005-0003598 A | 1/2005 |
| KR | 10-2009-0049936 A | 5/2009 |
| KR | 10-2010-0008043 A | 1/2010 |
| KR | 10-2011-0055392 A | 5/2011 |
| WO | 2011/020494 A1 | 2/2011 |
| WO | 2012/052569 A1 | 4/2012 |

OTHER PUBLICATIONS

Written Opinion from the International Bureau of WIPO for International Application No. PCT/KR2013/007638 dated May 28, 2014 and English translation of the same (9 pages).
European Search Report dated Nov. 17, 2015 for European Patent Application No. 13881453.8.
Contavalli et al: "Client IP information in DNS requests; draft-vandergaast-edns-client-ip-01.txt": May 21, 2010: pp. 1-23: XP015068632.
Chinese Office Action dated Apr. 6, 2017, for Chinese Patent Application No. 201380021199.X. (8 pages).
EPO; European Patent application No. 13881453.8; Office Action dated Dec. 3, 2018.

* cited by examiner

DOMAIN NAME SYSTEM (DNS) AND DOMAIN NAME SERVICE METHOD BASED ON USER INFORMATION

CROSS-REFERENCE TO RELATED APPLICATIONS

This application is a National Phase Patent Application of International Patent Application Number PCT/KR2013/007638, filed on Aug. 26, 2013, which is hereby incorporated herein by reference in their entirety.

FIELD OF THE INVENTION

The present invention relates to a domain name service, and more particularly, to a domain name system (DNS) and domain name service method based on user information, which stably manage lines by distributing and controlling destination paths by users and maintain the continuity of the service to users even during an abnormal operation of a server and a device which are used in the service.

BACKGROUND OF THE INVENTION

The Internet uses an IP address to distinguish objects. However, people tend to use a name rather than an address. Hence, there is need for a system that changes the name to the address and changes the address to the name.

In such a conversion system, names are mapped to addresses (all names and addresses are unique), and thus, if one person knows one of a name and an address, the system allows the person know the other. However, as the scale of the Internet increases, it has become impossible to store all names and addresses in a single computer.

In order to solve this problem, the currently used system is a domain name system (DNS) which divides a lot of information into small parts and stores respective parts in different computers.

The domain name has a plurality of labels which are divided by ".", and each label is composed of 63 characters maximum. In other words, a complete domain name is a continuation of labels which are divided by ".".
For example, "service.com" is composed of a service label, a com label, and a NULL label. (The NULL label is always included last in the domain name.)

Converting the name to the address or converting the address to the name is called a domain name address resolution.

FIG. 1 shows an example of a domain name address resolution process. The process of resolving the "www.service.com" domain will be described below as an example of a domain name with reference to FIG. 1.

Generally, users request a service with a domain name through a browser, and a host desiring to convert an address into a name calls a DNS client, which is called a resolver. The resolver connects to a closest DNS server to send the resolution request. The DNS server is set on the operating system of the host, and in the present specification, the DNS server is called a public DNS.

The resolution starts from the back of the domain name. There is always a NULL label 115 at the back of the domain name, and there is always a dot (.) at the last part of the domain name.

The NULL label 115 refers to a root DNS server 130, and the public DNS 125, which has received the user's domain request message, requests the IP address of the "www.service.com" from the root DNS server 130.

If the root DNS server 130 does not have the IP address information for the domain, the root DNS server 130 responds with an address of a com name server 135 having information on a com label 110.

The public DNS 125 requests the IP address of "www.service.com" from the com response-received name server 135, and the com name server 135 responds with a DNS server 140 having information (authority) of a service label 105.

Again, the public DNS 125 requests the resolution for the "www.service.com" from the request-received DNS server. The request-received DNS server has the mapped IP address for the "www" in a Zone File 145 having the information of the service, and thus the IP address (200.1.1.1) is sent as a response.

The response-received public DNS server 125 responds with "200.1.1.1" to a resolver 120 of the client, and after the resolver 120 resolves the response message, the value is handed over to the client program which has requested the resolution.

Likewise, the scheme, where the DNS server hands over the IP of the DNS server having the authority for the domain and repeatedly attempts an inquiry, is called an iterative resolution.

Furthermore, the DNS server responds with the IP address which is matched with the domain name in the Zone File, and in the initial period, a lot of changes to the addresses were not expected.

When the domain name and the mapped IP address information need to be changed, it is very difficult for the manager to manually make changes one-by-one. A solution to the problem is a dynamic DNS, which automatically updates the DNS address file.

However, in order to provide user-based information, user information needs to be collected from the DNS request message, and the information is extremely limited in a conventional DNS request message. Furthermore, the master file of the DNS server is frequently corrected, i.e., the mapped information is frequently added, removed, and changed, and in the case of a service where synchronization needs to be always maintained, it is difficult to completely perform the function with the conventional static DNS.

Furthermore, a distributed denial-of-service (D-DOS) attack refers to causing the DOS as a plurality of systems cooperate on the Internet and attack one target system. The target system finally stops due to overflowing messages, and thus the system fails to provide a service to innocent users. That is, since particular resources and usable line traffic is monopolized, and thus the target system fails to provide a service to innocent users.

Furthermore, load balancing refers to distributing and allocating the process load between devices operated in parallel. The load balancing is a concept which is widely used in various fields such as equally granting the process load to various microprocessors in the computer or returning the connection request to the available server on the network. In order to efficiently perform the load balancing, the load of each device needs to be continually measured, and for accurate application, the control itself of the load balancing generates a heavy load. Hence, the actually used load balancing is set to be done with accuracy, and a continuous search for a more efficient way is under way.

However, in a bandwidth attack, it is difficult to block the attack only with the advancement of the equipment (IPS, server). In a network bandwidth attack, the network bandwidth attack becomes stronger along with the network performance of a zombie personal computer (PC). As the network used by the zombie PC and the PC has a better performance, the attack becomes stronger. On previous ADSL, in order to make a 100 Gb/s attack, 100,000 zombie PCs are needed, but in the recently distributed optical LAN (upload 100 Mb/s), only 1000 zombie PCs are needed. Furthermore, in the future, if a Giga Bit Home LAN is used, only 100 zombie PCs are needed to make a 90 Gb/s attack. The IPS equipment may continually advance, but it may be very difficult to block bandwidth attacks.

Furthermore, when the IP address of the server is exposed and available to the public, the server can be attacked by a malicious user. In a DNS server, name server information is available to the public through the domain management organization, and thus the exposure of the IP address is inevitable. Furthermore, when the DNS server itself becomes unusable, the domain service itself, which has been managed in the DNS server, is impossible.

SUMMARY OF THE INVENTION

The present invention provides a domain name service, and more particularly, to a domain name system (DNS) and domain name service method based on user information, which stably manage lines by distributing and controlling destination paths by users and maintain the continuity of the service to users even during an abnormal operation of a server and a device which are used in the service.

According to an aspect of the present invention, there is provided a domain name service system based on user information including: a client which outputs a domain name query including user information and service domain name information; a domain name system (DNS) which receives the domain name query from the client; and a database which receives the domain name query from the DNS, extracts the user information included in the domain name query, and differently provides destination path information for each set of user information, wherein the client receives destination path information for each set of user information from the database through the DNS.

The database may provide host server path or proxy path information for each set of user information, and detour DNS server path or detour proxy or gateway path information, which may be used instead of the DNS when the DNS does not operate. The client may include: a client resolver which transmits a DNS request message to the DNS which is set for a domain analysis; and an agent which adds user information to the DNS request message and outputs a query to the DNS.

According to an aspect of the present invention, there is provided a domain name service system based on user information including: a DNS which receives the domain name query including user information and service domain name information from a client; and a database which receives the domain name query from the DNS, extracts the user information included in the domain name query, and differently provides destination path information for each set of the user information, wherein the DNS transmits the destination path information for each set of the user information outputted from the database to the client. Here, the database may provide host server path information or proxy or gateway path information for each set of user information, and detour DNS server path information or detour proxy or gateway path information, which may be used instead of the DNS when the DNS does not operate.

According to an aspect of the present invention, there is provided a domain name service system based on user information including: a query reception unit which receives a domain name query including user information and service domain name information from a client; a path provision unit which extracts the user information included in the domain name query received from the query reception unit, and differently provides destination path information for each set of the user information; and a query response unit which transmits destination path information for each set of the user information, which is outputted from the path provision unit, to the client. The path provision unit may provide host server path information or proxy or gateway path information for each set of user information, and detour DNS server path information or detour proxy or gateway path information, which may be used instead of the DNS when the DNS does not operate.

According to an aspect of the present invention, there is provided a method of providing a domain name service based on user information, including: outputting, by a client, a domain name query including user information and service domain name information; receiving, by the DNS, the domain name query from the client; and receiving the domain name query from the DNS and extracting the user information included in the domain name query; and providing destination path information differently according to the extracted user information. The method may further include receiving, by the client, destination path information for each set of the user information which is outputted from the database.

Further, there is provided a recording medium readable by a processor having recorded a program executed by the processor.

According to the domain name service system based on user information of the present invention, the lines are stably managed by distributing and controlling destination paths by users, and the continuity of the service may be maintained even during an abnormal operation of the server and the device which are used in the service.

Furthermore, a bandwidth attack by the D-DOS may be blocked by distributing and controlling the destination paths by users. Furthermore, an abnormal attack and the user, which have caused an obstacle, may be promptly detected by searching for the user, who has been allocated equipment such as the proxy and the gateway, in the database, and an additional measure may be taken.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 2:
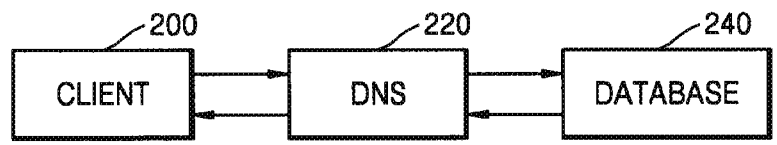
FIG. 2 shows a configuration of a domain-address service system based on user information, according to an embodiment of the present invention.

FIG. 2 shows a configuration of a domain name service system based on user information, according to an embodiment of the present invention. The domain name service system includes a client 200, a DNS 220, and a database 240.

The client 200 transmits the domain name query, including user information and domain name information, to the DNS. Furthermore, the client 200 receives destination path information for each user information set, which is outputted from the database 240, through the DNS 220.

The DNS 220 receives the domain name query from the client 200.

The database 240 receives the domain name query from the DNS 220 and extracts the user information included in the domain name query so as to provide the destination path information for each user information set. Specifically, the database 240 may provide detour DNS server path information or detour proxy or gateway path information, which may be used instead of the DNS when the host server path information or proxy or gateway path information and the DNS do not work for each user information set.

The client 200 may include a resolver (not shown) which transmits the DNS request message to a DNS which has been set for resolving the domain, and an agent (not shown) which outputs the query to the DNS by adding user information to the DNS request message.

Furthermore, the domain name service system based on user information, according to the present invention, may be formed of a DNS 220 and a database 240 separately from a client. Here, the DNS 220 receives the domain name query including the user information and the service domain name information from the client 200. Furthermore, the database 240 may receive the domain name query from the DNS 220 and extract the user information included in the domain name query so as to differently provide the destination path information for each user information set.

Here, the DNS 220 transmits the destination path information for each user information set, which is outputted from the database 240, to the client 220. Furthermore, the database 240 may provide detour DNS server path information or detour proxy or gateway path information, which may be used instead of the DNS when the host server path information or proxy or gateway path information and the DNS do not operate for each user information set.

Figure 3:
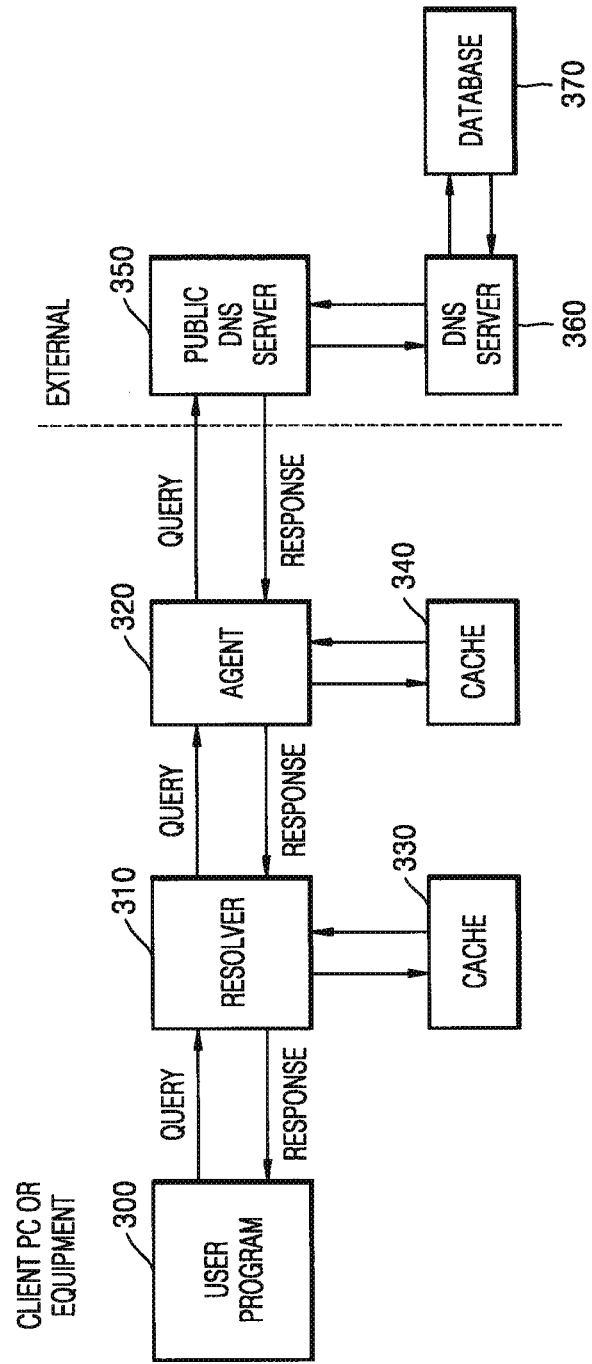
FIGS. 3 and 4 each show a block diagram of a detailed configuration of a client PC or equipment which is used in the process of requesting the DNS resolution of a client.
Figure 4:
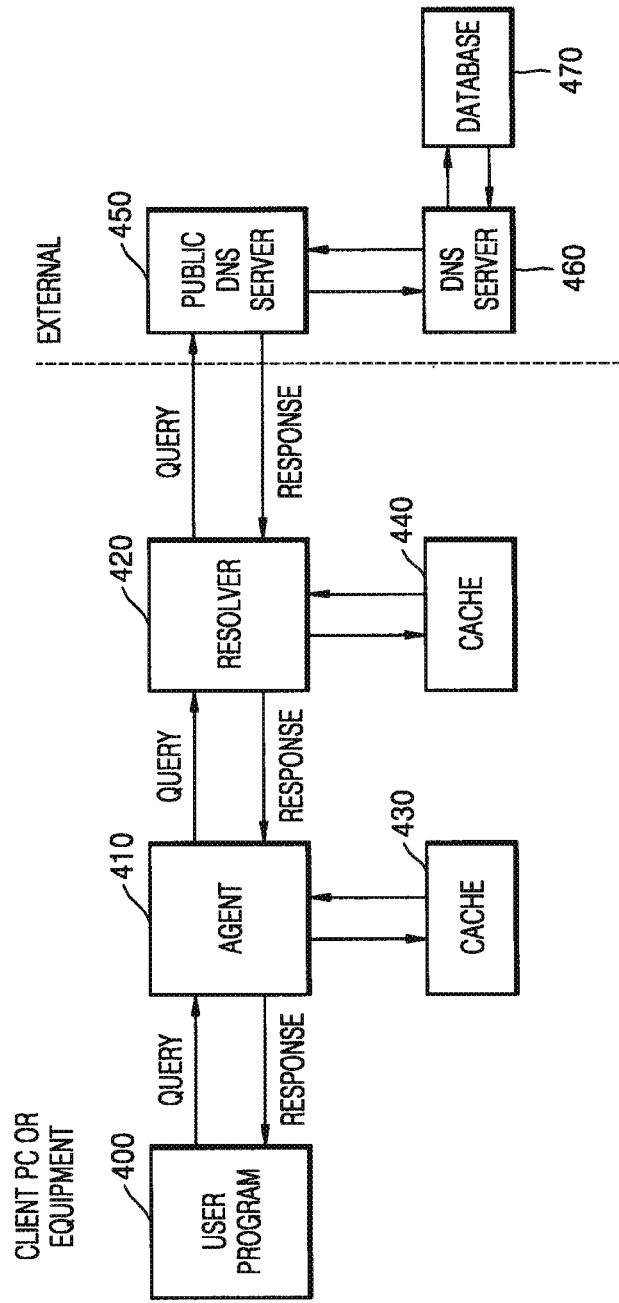

FIGS. 3 and 4 each show a block diagram of a detailed configuration of a client PC or equipment which is used in the process of requesting the DNS resolution of a client 200.

Figure 13:
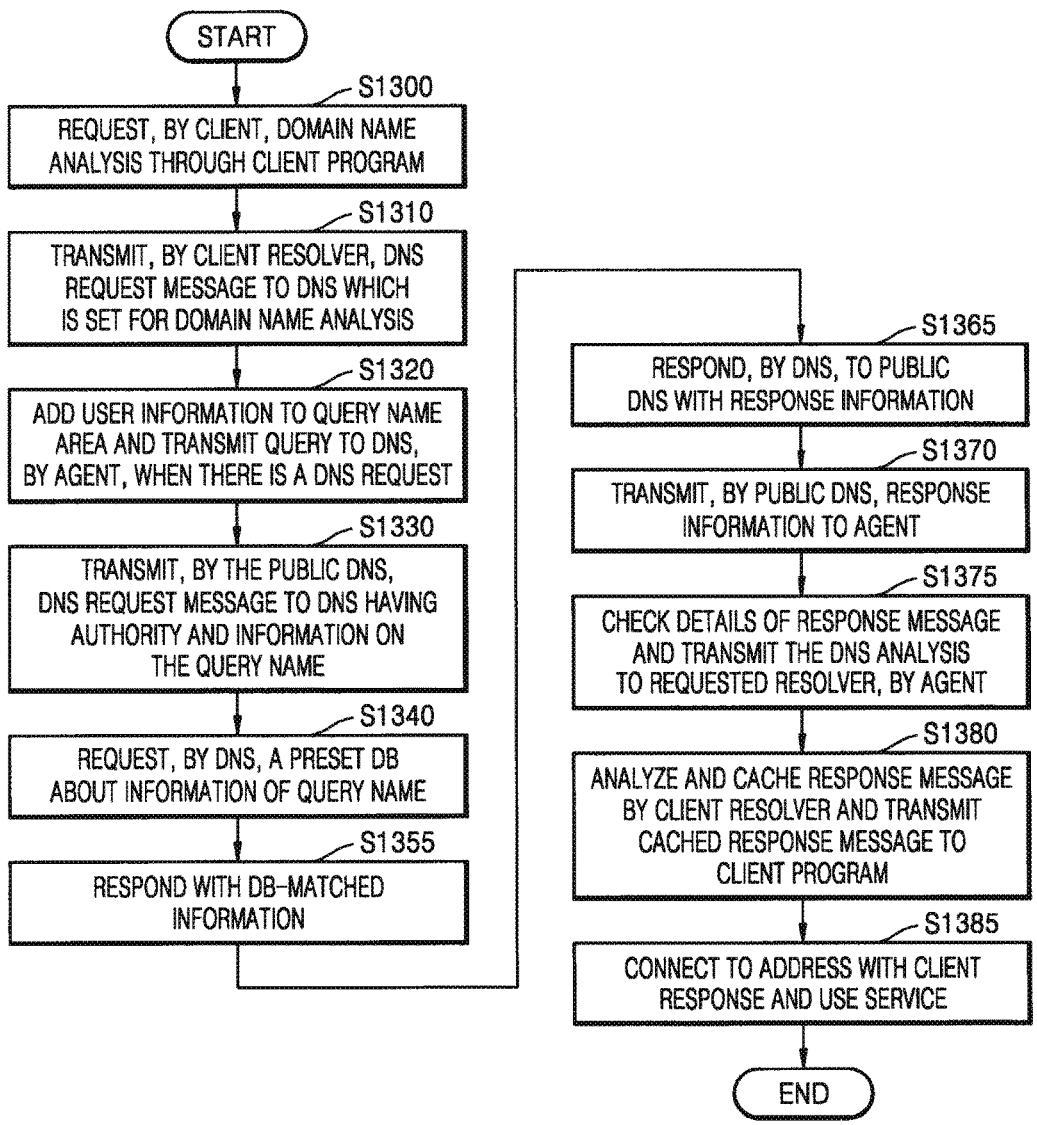
FIG. 13 is a flowchart of a domain name service method based on user information, according to another embodiment of the present invention.

The client 200 according to the present invention includes user programs 300 and 400, resolvers 310 and 420, agents 320 and 410, and caches 330, 340, 430, and 440. Further, FIG. 13 is a flowchart of a domain name service method based on user information, according to an embodiment of the present invention.

Exemplary embodiments on the domain name service system and method based on user information of the present invention will be described in detail below with reference to FIGS. 3, 4, and 13.

The user program 300 requests domain name resolution from the resolver 310 (S1300). The resolver 310 transmits the DNS request message to the DNS which is set for the domain name resolution (S1310). At this time, if there is a DNS request, the agent 320 adds user information to the query name area of a request section so as to transmit the DNS request message to a public DNS server 350.

The public DNS server 350 transmits information of the query name to a DNS server 360 having information (authority) of the DNS request message. The DNS server 360 having information (authority) enquires a predetermined database 370 (S1340). The DNS 360 performs a function of adding, correcting, and extracting a request message on the database 370. The database 370 responds with matched information (S1355). Here, the database 370 may extract user information added by the agent 320 so as to provide destination path information for each user information set, such as host server path information or proxy or gateway path information and detour DNS server path information or detour proxy or gateway path information.

The DNS server 360 transmits response information received from the database 370 to the public DNS 350 (S1365). If the public DNS 350 transmits the response information received from the DNS server 360 to the agent 320 (S1370), the agent 320 checks the content of the response message and transmits the DNS resolution to the resolver 310 (S1375). The resolver 310 analyzes and caches the response message and then transmits the cached response message to the user program 300 (S1380), and then the user program 300 connects to the response-received address so as to use the service (S1385). Here, the resolver 310 may cache the response message if the response message has the detour DNS server path information or detour proxy or gateway path information.

Furthermore, the positions of the resolver 310 and the agent 320 of FIG. 3 may be changed as in FIG. 4. That is, the agent 410 may transmit the DNS query to the resolver 420 and transmit the response message outputted from the resolver 420 to the agent 410.

Figure 5:
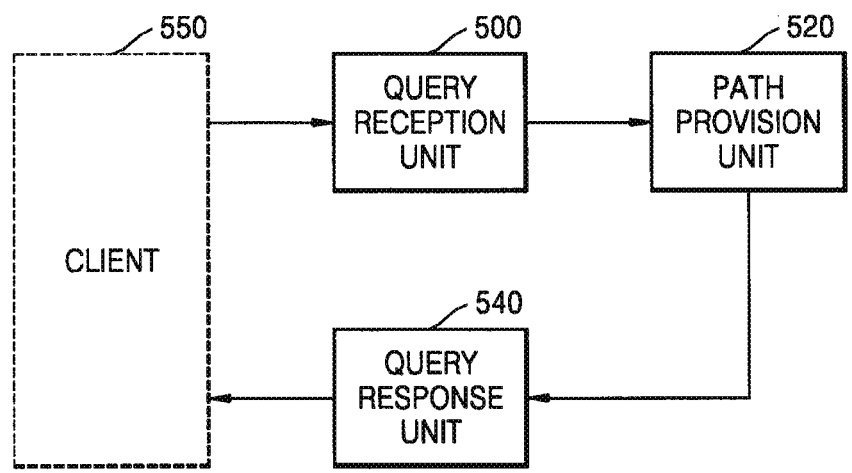
FIG. 5 is a block diagram of another example of a configuration of a domain name service system based on user information, according to the present invention.

FIG. 5 is a block diagram of another example of a configuration of a domain name service system based on user information, according to the present invention. The domain name service system includes a query reception unit 500, a path provision unit 520, and a query response unit 540.

The query reception unit 500 receives a domain name query including user information and service domain name information from a client 550.

The path provision unit 520 extracts the user information included in the domain name query from the query reception unit 500, and provides the destination path information to the query response unit 640 for each user information set.

The path provision unit 520 may provide server path information or proxy or gateway path information for each user information set, and detour DNS server path information or detour proxy or gateway path information, which may be used instead of the DNS when the DNS is not operating.

The query response unit 540 transmits the destination path information for each user information set, which is outputted from the path provision unit 520, to the client 650.

The query reception unit 500, the path controller 520, and the query response unit 540 may be implemented and installed in one system, and the path controller 520 may be implemented and installed using a separate device such as a database.

Figure 6:
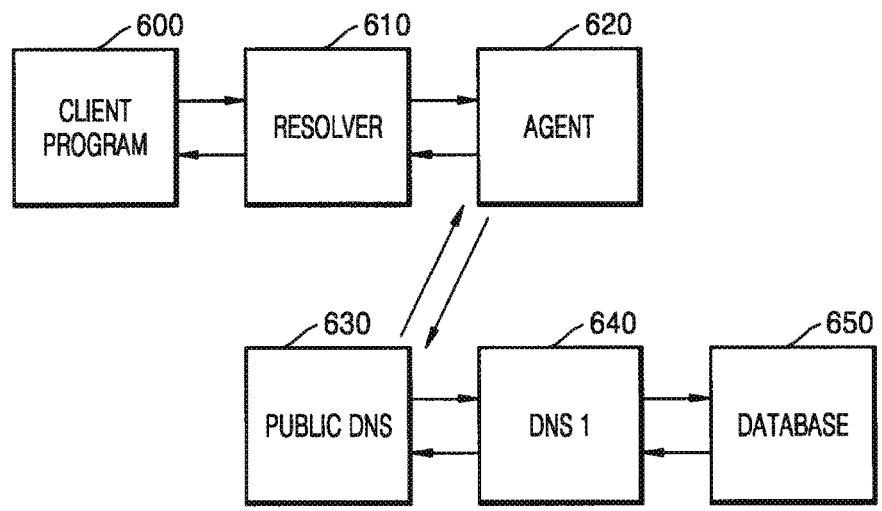
FIG. 6 is a block diagram of a system configuration for illustrating an example a data transmission process between a client and a database in a domain name service system based on user information, according to the present invention.

FIG. 6 is a block diagram of a system configuration for illustrating an example a data transmission process between a client and a database in a domain name service system based on user information, according to the present invention.

An agent 620 is a program or device which performs a function of including user information to the message when the user information is collected and the DNS resolution of the user program (browser) is requested.

Figure 10:
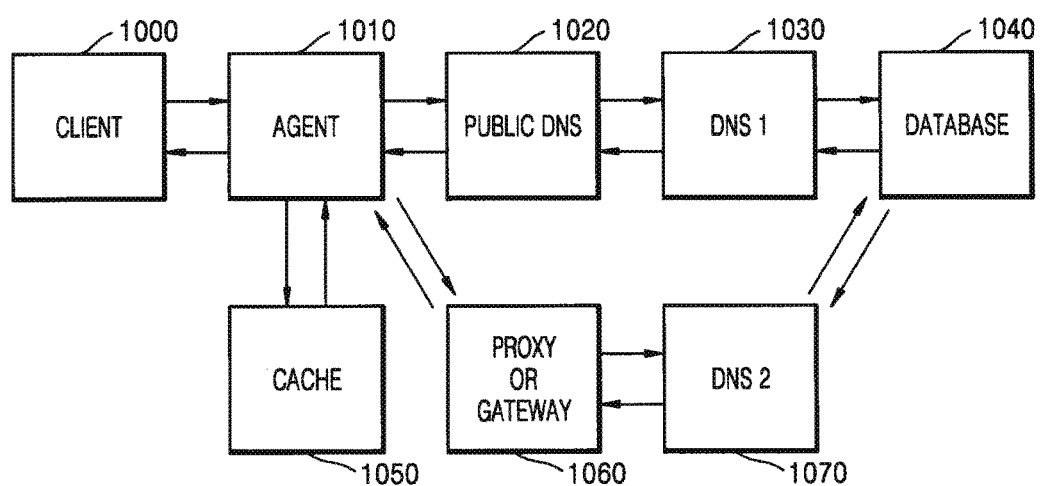
FIG. 10 shows a DNS detour path control according to an embodiment of the present invention.

A DNS server, namely, a first DNS server 640, requests the DNS request message of a host from a predetermined database 650, and transmits information received from the database 650 to the agent 620 through a public DNS 630. The first DNS 640 is a DNS server whose name server information is published and is the same as a first DNS server 1030 of FIG. 10. Furthermore, a second DNS server 1070 of FIG. 10 is a DNS server whose name server information is not published, and uses the same database as that of the first DNS 640 and plays the same role as that of the first DNS 640.

Databases 650 and 1040 store data which is used in the service or management of the DNS, and store the setting of different destination paths for each user.

It is assumed that the domain name service system based on user information, illustrated in FIG. 6, has the following conditions:

1) The domain "service.com" performs path control based on user information through the first DNS 640.

2) The user desires to connect to a web server which uses the service.com domain through a program such as a browser.

3) The service.com domain is registered in advance.

4) The database 650 stores proxy or gateway path information (IP address, domain, etc.), path information of the gateway (IP address, domain, etc.), or host server path information (IP address, domain, etc.) for accessing to the host server of the service.com for each user information set.

5) Various information sets for authenticating the user, such as Mac ID and Login ID as well as the IP address, may be singularly or compositively as client information, but it is assumed in FIG. 6 that only the IP address is used.

6) It is assumed that the public IP of the client is 100.100.100.1.

7) It is assumed that the IP address of the destination (proxy or gateway of the service.com) is 200.0.0.1.

The user-based destination path provision using the DNS is performed as follows: First, the process where the user's request is transmitted by the agent is as follows: A first user requests the IP address for the domain name ("service.com") from the resolver 610, which is a DNS client, through a client program 600. The request-received resolver 610 transmits the DNS request message to the DNS server address where the domain name is set in the operating system, and the pre-installed agent 620 changes the DNS request message as follows:

Before change: "service.com
After change: "100_100_100_1.Service.com"
Here, "100_100_100_1" is a simple expression of the client IP, and the information represents the non-encrypted client IP address.

The agent 620-changed message is transmitted to the DNS server address which is set in the operating system (OS).

The public DNS 630 sends a resolution request to the root name server to resolve the "100_100_100_1.Service.com" domain, and the root name server notifies the address of the "com" name server. The "com" name server notifies again the address of the DNS server where the "service.com" domain information is registered. The com name server notifies again the address of the DNS server where the service.com domain information is registered. The DNS server resolves "100_100_100_1.Service.com", and enquires for the domain content of the database 650.

The database 650 responds again to the DNS name server with an IP address: 200.0.0.1 of information which is matched to the data.

If there is no matched information, the first DNS 640 inserts information on the client 100_100_100_1 into the database 650 according to a preset policy.

The first DNS 640 responds to the public DNS 630 with received information, i.e., the destination path. The public DNS 630 responds to the agent 620 with the domain resolution result.

The agent 620 analyzes the response message, and if the received information is the IP address, the agent caches the IP address. Then, the result of the domain name resolution is sent to a resolver 610.

The resolver 610 sends the path to the client program 600 which has requested the domain resolution. The client program 600 connects to the server whose destination IP address is 200.0.0.1.

Figure 7:
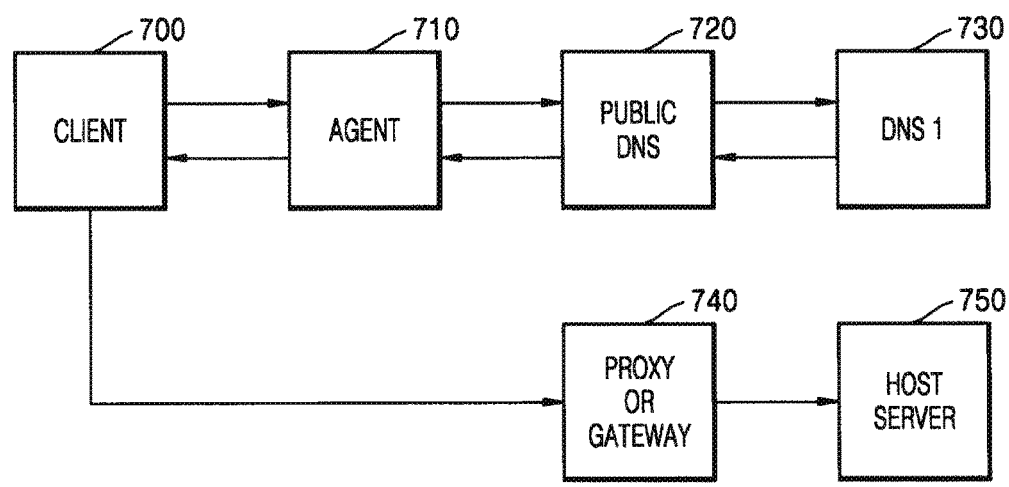
FIG. 7 shows a service process between a client and a host server from which a service is provided to the client.

FIG. 7 shows a service process between a client 700 and a host server 750 from a service is provided to the client 700.

As shown in FIG. 7, if a client 700 outputs a DNS query, an agent 710 adds user information to the DNS query, and transmits a domain name query including user information and domain name information to a first DNS server 730 through a public DNS 720. Then the first DNS server 730 extracts the user information from the domain name query, and transmits the destination path information corresponding to the extracted user information, such as host server path information or proxy or gateway path information, and detour DNS server path information or detour proxy or gateway path information to the agent 710 through the public DNS 720. If the agent 710 transmits the host server path information or proxy or gateway path information to the client 700, the client 700 accesses a host server 750, which is the destination, through a prearranged host server, proxy, or gateway 740 based on the client 700's own information.

Figure 8:
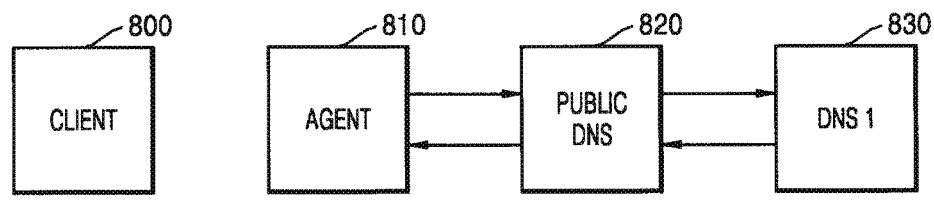
FIG. 8 shows a process of acquiring information by an agent in providing information on a program and a device using DNS.

FIG. 8 shows a process of acquiring information by an agent in providing information on a program and a device using DNS.

In this process, a program and a device send a query to a first DNS server 830 so as be provided information. An agent 810 sends a DNS query including device information such as a program version and a setting version to the DNS periodically or when a certain event occurs so as to be provided information from a database.

The DNS query may be sent as a text, and may be responded in any format which may be applicable to a query type of a DNS query record.

If the agent 810 sends the DNS query "configversion00002.service.com" including the program version of the agent 810 itself to a public DNS 820 in a text format every 10 seconds and sends the request to the first DNS server 830 having the information of the "service.com", the first DNS server 830 responds in a text format with information matched with the database.

The agent 810 may use the secondary information by applying or processing the information included in this response message.

Figure 9:
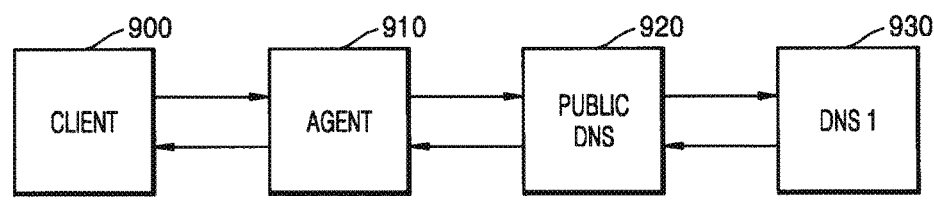
FIG. 9 shows a process of obtaining information by a user when providing information on a program and a device using DNS.

FIG. 9 shows a process of obtaining information by a user when providing information on a program and a device using DNS. The process is similar to the information acquisition by the agent, but the query is transmitted to a first DNS server 930 via an agent 910 and a public DNS 920 by the request of a client 900 so as to be provided information.

Furthermore, FIG. 10 shows a DNS detour path control according to an embodiment of the present invention. The DNS detour path control is performed as follows:

The DNS is exposed to a direct attack such as a D-Dos attack by opening, for example, the IP and other registration information of the DNS server.

In the case of an abnormal situation, for example, when a normal DNS service is unavailable due to an error in the DNS server or an attack of a malicious user because of the availability to the public of the name server information of the DNS, the first DNS server 1030 maintains the continuity of the DNS service to the user where the agent 1010 has been installed by controlling the DNS request path with the second DNS Server 1070. This function is called DNS detour path control.

That is, the DNS detour path control controls the path to another second DNS server 1070, which uses the function and the same database when the first DNS server 1030 cannot be used.

The service situation is divided into the following two situations to illustrate an appropriate use of detour path control:

The first situation is a normal service process, and the second situation is a service process in an emergency situation, that is, when the first DNS server 1030, which is used in the normal service process, is not available.

The normal service process is the same as described with reference to FIGS. 6 and 7 which are expressed in the above DNS service model. However, only one user information set is additionally operated, and the user information set is path information of a proxy or gateway having information of the second DNS server 1070 or path information of the second DNS server 1070, that is, the IP address information of the proxy or gateway which plays the same role as that of the public DNS or IP address information of the second DNS server 1070.

The resolver generates the DNS request packet by the DNS resolution request of a client 1000, then the agent 1010 modifies the message and makes a request to the first DNS server 1030 through a public DNS 1020. The first DNS server 1030 provides information on the destination or the path based on user information included in the domain, and in this case, the path information of the second DNS server 1070 based on user information, for example, a proxy or gateway IP address or domain name may be simultaneously or sequentially included in the DNS response message so as to be transmitted.

The public DNS 1020 responds to the agent 1010 again with a response message, and the agent 1010 analyzes the corresponding DNS response message, and here, the situation is divided into the following two situations:

The first situation is a case when the response message is a normal response message. The agent 1010 divides the DNS response message into a response to the DNS request and detour DNS information, and caches the detour DNS information (second DNS information set) in a memory of a client 1000. If information is already cached, the information is changed, and the DNS response message is transmitted to the client 1000 through the resolver, and the client program uses a desired serviced through a reception path.

The second situation is a case when the message is an abnormal response message. In this case, the agent 1010 determines that the first DNS server 1030 cannot provide a normal service, and transmits the DNS request message with cached detour information such as the IP address of the proxy or gateway or domain name.

A proxy or gateway 1060 requests information matched with the domain name to the preset second DNS server 1070 or a device which is implemented to play the same role, and receives a response and sends the response to the agent 1010. At this time, the DNS request message is the same as the initially transmitted DNS request message, and the response is also the same because the same database is referred to. Both UDP and TCP communication are supported, and protocol modulation is also possible. Only, the detour path transmits path information of a third DNS server such as a third server DNS, which is not shown.

That is, the DNS provides the information on the domain name and the DNS detour information at the same time, and the agent 1010 receives the DNS service using the second DNS server 1070 whose name server information has not yet been exposed through the detour address when the use of the first DNS server 1030 is not possible in a state where the detour information is cached and stored.

Figure 11:
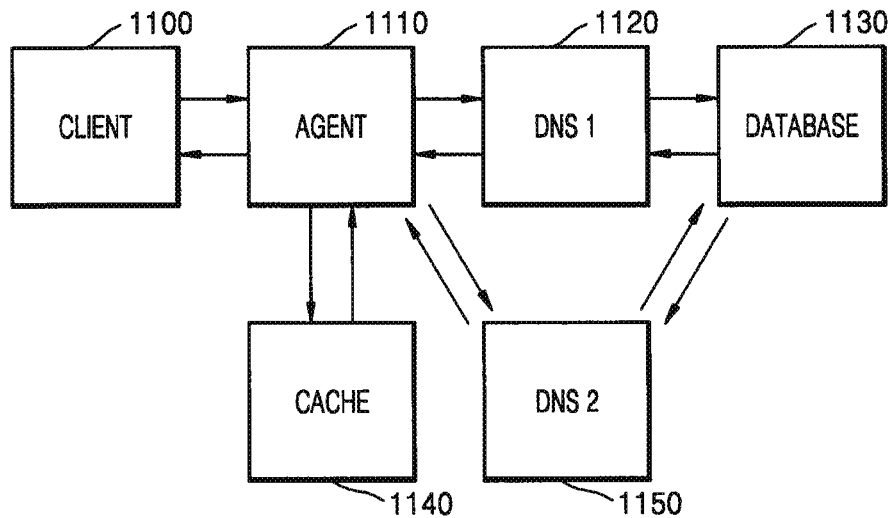
FIG. 11 shows a DNS detour path control according to another embodiment of the present invention.

FIG. 11 shows a DNS detour path control according to another embodiment of the present invention. FIG. 11 shows a case when there is no public DNS server 1020 and no proxy or gateway 1060 in FIG. 10. A client 1100, an agent 1110, a first DNS 1120, a database 1130, a cache 1140, and a second DNS 1150 have the same function as that of the agent 1010, the first DNS 1020, the database 1030, the cache 1040, and the second DNS 1050 of FIG. 10, respectively.

Furthermore, the DNS detour path control described in FIG. 10 may be performed without one of the public DNS 1020 and the proxy or gateway 1060 of FIG. 10.

Figure 12:
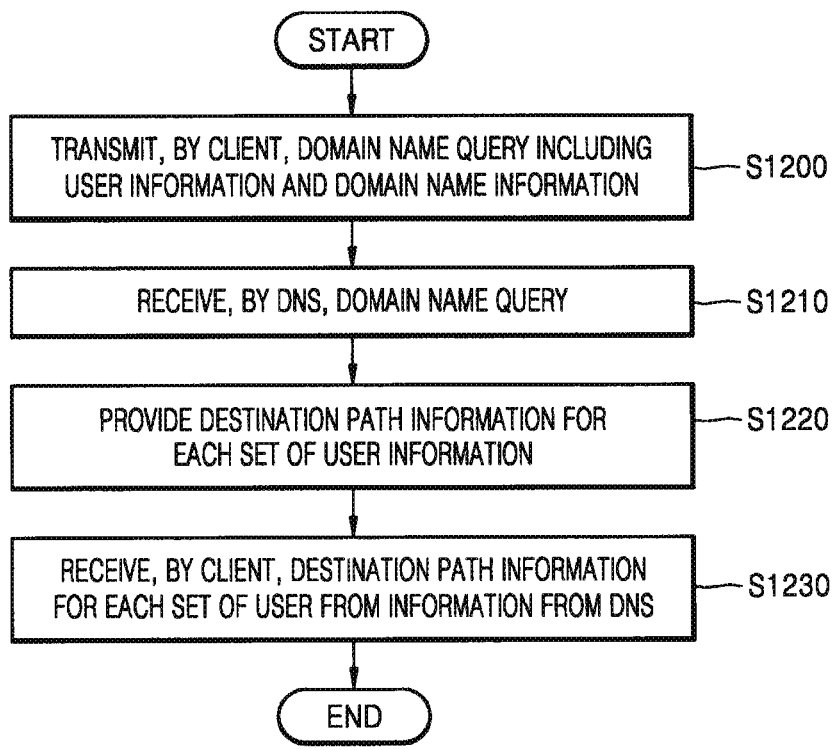
FIG. 12 is a flowchart of a domain name service method based on user information, according to an embodiment of the present invention.

Furthermore, FIG. 12 is a flowchart of a domain name service method based on user information, according to another embodiment of the present invention.

Referring to FIGS. 2 and 12, first, the client 200 transmits the domain name query including user information and service domain name information to the DNS 220 (S1200). The DNS 220 receives the domain name query from the client 200 and transmits the received domain name query to the database 240 (S1210). The database 240 receives the domain name query from the DNS 220, extracts the user information included in the domain name query, and differently provides the destination path information according to the user information (S1220). Here, the destination path information provision may include providing host server path information or proxy or gateway path information for each user information set and providing detour DNS server path information or detour proxy or gateway path information, which is usable instead of the DNS when the DNS does not operate. Furthermore, the client 200 receives the destination path information for each user information set from the database 240 through the DNS 220 (S1230).

As described above, the domain name service system and method based on user information according to the present invention separate an attacker from a general user in response to different host information for each user when there is an external attack such as D-Dos attack. To this end, if the client requests domain name resolution, a program and equipment for transmitting user information together may be used.

Furthermore, the IP address of the server, which becomes the subject of an attack, is not exposed, and when it is not possible to use of the DNS server, a detour path for differently using the DNS, whose IP address has not been exposed, for each user or each group to which the user belongs, is temporarily provided. To this end, the DNS server manages the domain information through the database, not through the zone file. The database exists at in or outside the DNS. Furthermore, when registering the domain, the time to live (TTL) is set to a minimum value so as not to be cached.

Furthermore, the detailed data format, which is used in the domain name service system and method based on user information according to the present invention is as follows:

First, Client's DNS message data format is shown below.

TABLE 1

| DNS message data format | | | | |
|---|---|---|---|---|
| Mac header | IP header | TCP/UDP header | DNS header | Data |

The DNS message data format is a DNS message including a lower layer header of the open systems interconnection (OSI) reference model before decapsulation.

The information on the user, i.e., the client information which has requested the DNS message, may be understood through the header of the lower layer. For example, the Mac address of the part which transmits the packet may be found through the Mac header, the departure location address of the packet, i.e., the source address, may be found through the IP header, and the used port may be found through the TCP/UDP header.

Figure 1:
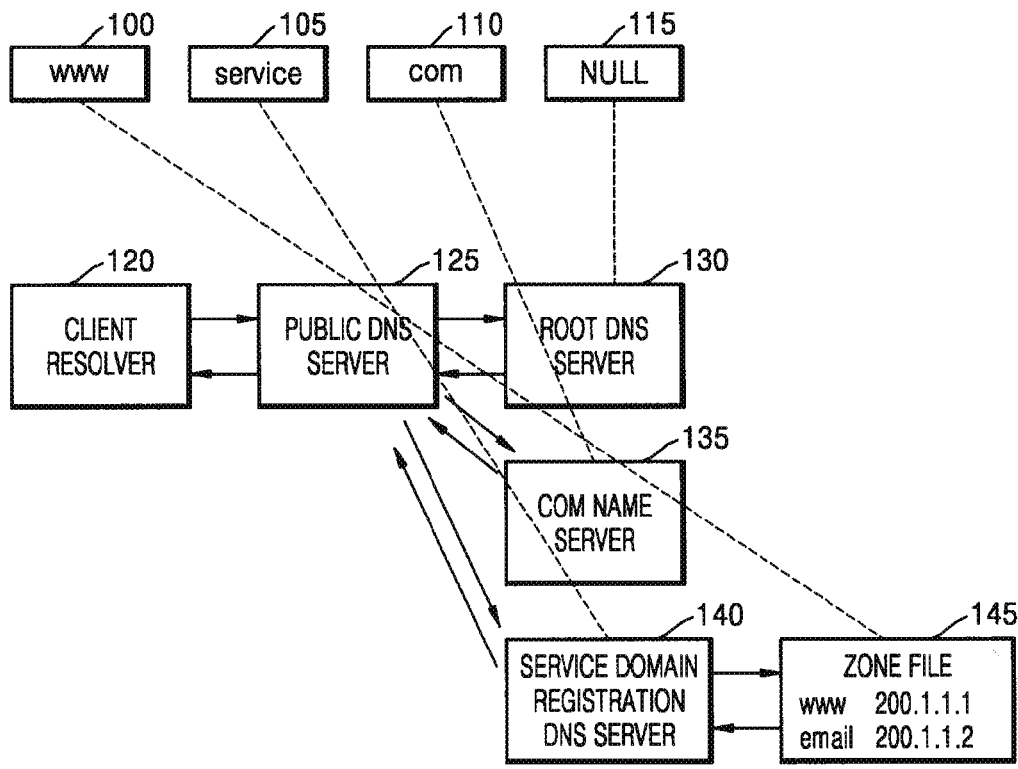
FIG. 1 shows an example of a domain name address resolution process.

However, as illustrated in FIG. 1, the departure location of the packet, which is received by the DNS on the currently used DNS, is the information of the public DNS, not the information of the user (client).

Furthermore, the formats of the DNS request message and the DNS response message are shown below.

TABLE 2

| DNS request message format |
|---|
| Header |
| Question section |

TABLE 3

| DNS response message format |
|---|
| Header |
| Question section |
| Answer section |
| Authoritative section |
| Additional section |

The agent does not correct the header of the DNS request and response messages in order to follow the request for comment (RFC) standard, which is a standard which is commonly used in the existing DNS.

Furthermore, the format of the DNS query record is shown below.

TABLE 4

| DNS query record format |  |
|---|---|
| Query name | |
| Query type | Query class |

The query name field has a variable length and includes the domain name.

The query type is composed of 16 bits and indicates the type of a query.

The types of queries frequently used in the present invention are described in Table 5 below.

TABLE 5

| Type | Mnemonic | Description |
|---|---|---|
| 1 | A | IPv4 address |
| 2 | NS | Name server |
| 5 | CNAME | Canonical name |
| 28 | AAAA | IPv6 address |
| 16 | TXT | Text |

The agent corrects the query name and the query type in the DNS query recording format, and transmits the DNS query message. Furthermore, it is also possible to change the query type in order to receive text-type information such as information needed in the client module, as well as the IP address.

Furthermore, in the domain name service system and method based on user information, according to the present invention, an example of a query name change before and after addition of user information is as follows:

When adding user information through one label:
Before change: www.service.com
After change: ipaddressuserid.www.service.com
When adding user information through a plurality of labels:
Before change: www.service.com
After change: ipaddress.userid.www.service.com
When adding information of the client module using the above method:
Before change: www.service.com
After change: moduleversion.userid.www.service.com
When adding equipment information using the above method:
Before change: www.service.com
After change: devinfo.www.service.com
That is, Information is added to the front of the domain name so that the DNS service may receive the information.
When servicedomain "www.service.com" is corrected so as to be received by another DNS server:
Before change: www.service.com
After change: ipaddress.userid.service.otherdns.com
That is, the DNS server, in which the domain information "otherdns.com" is registered, analyzes the domain information corresponding to the state after change.

Furthermore, an example of a database connection is shown in FIG. 6 below.

TABLE 6

An example of a database connection

| Description | Example | Matched information |
| --- | --- | --- |
| User A information | Aclientinfo.service.com | 200.0.0.1 |
| User B information | Bclientinfo.service.com | 200.10.10.10 |
| Equipment A information | Adevinfo.service.com | Information (text type) |
| Equipment B information | Bdevinfo.service.com | Information (text type) |

An example of FIG. 6 is a simple example for description, and the information matched with the requested domain name may be responded in various types as in Table 5. The DNSSEC scheme may also be applied for the security-requested DNS service.

Furthermore, an example of response data of the DNS of the present invention is described below. As response data used in the embodiment of the present invention, when DNS analysis is requested, the destination path for each user information (client) set, and the DNS detour information are responded together. The DNS response may include the destination IP address and the detour DNS address within one response message, or may be divided into two DNS response messages, depending on the policy.

TABLE 7

| Destination IP address | Detour DNS address |
| --- | --- |

Even when information is inputted or acquired, the DNS detour information is responded together.

TABLE 8

| Equipment information | Detour DNS address |
| --- | --- |

The invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc.

While one or more embodiments of the present invention have been described with reference to the figures, it will be understood by those of ordinary skill in the art that various changes in form and details may be made therein without departing from the spirit and scope of the present invention as defined by the following claims.

The present invention may be applied to a DNS and domain name service which may maintain service continuity to users during an abnormal operation of a service and device which is used in the service.

The invention claimed is:

1. A domain name service system based on user information, the domain name service system comprising:
  a client apparatus including an agent that outputs a domain name query comprising a domain name system (DNS) request message having user information added thereto;
  a first DNS server that receives the domain name query from the client apparatus, and outputs the domain name query;
  a second DNS server whose name server information is not published, that replaces the first DNS server when the first DNS server cannot operate due to an external attack or operation failure; and
  a database system that:
    receives the domain name query from the first DNS server;
    extracts the user information included in the received domain name query; and
    provides the first DNS server with destination path information for the extracted user information and path information of the second DNS server, wherein the path information of the second DNS server is not published, and is assigned differently for each received user information;
  wherein the first DNS server further:
    receives the destination path information corresponding to the domain name query of the client apparatus and the path information of the second DNS server from the database system; and
    transmits the destination path information and the path information of the second DNS server to the client apparatus, and
  wherein the agent of the client apparatus further:
    receives the destination path information and the path information of the second DNS server from the first DNS server in response to the domain name query and sends the destination path information and the path information of the second DNS server to the client apparatus;
    stores the path information of the second DNS server;
    outputs a subsequent domain name query comprising a domain name system (DNS) request message having user information added thereto to the first DNS server; and
    outputs a domain name query to the second DNS server by using the stored path information of the second DNS server-when the first DNS server cannot operate due to an external attack or operation failure for the subsequent domain name query.

2. The domain name service system of claim 1, wherein the database system further:
  stores a different proxy path information for each of the user information;
  extracts the user information included in the domain name query when receiving the domain name query from the first DNS server; and
  provides the first DNS server with the path information of the proxy for the extracted user information;
  wherein the proxy whose server information is not published, is:
  used instead of the first DNS server when the first DNS server cannot operate due to an external attack or operation failure.

3. The domain name service system of claim 1, wherein:
  the first DNS server comprises a query reception unit that receives the domain name query including the user information from the client apparatus;
  the database system comprises a path provision unit that:
    stores destination path information for each received user information;
    extracts the user information included in the domain name query transmitted from the query reception unit;
    provides the first DNS server with the destination path information for the extracted user information and path information of the second DNS server that is used instead of the first DNS server in a case where the first DNS server cannot operate due to an external attack or operation failure for the subsequent domain name query; and the first DNS server further comprises a query response unit that transmits the destination path information and the path information of the second DNS server provided from the path provision unit to the client apparatus.

4. The domain name service system of claim 1, wherein the database system stores destination path information corresponding to each user information received from a plurality of client apparatuses.

5. The domain name service system of claim 1, further comprising:
   a public DNS server whose information is set on the operating system of the client apparatus, that:
      performs a recursive query as an open DNS;
      receives the domain name query from the client apparatus and transmits the domain name query to the first DNS server; and
      receives the destination path information and the second DNS server path information from the first DNS server and transmit the received second path information to the client apparatus.

6. The domain name service system of claim 1, further comprising:
   a proxy server whose path information is assigned differently for each user, that:
      exists on a path of the second DNS server;
      receives the subsequent domain name query from the agent; and
      transmits the subsequent domain name query to the second DNS server.

7. A method of providing a domain name service based on user information, the method comprising:
   outputting, by a client apparatus, a domain name query including user information;
   receiving, by a first DNS server, the domain name query from the client apparatus;
   receiving, by a database system, the domain name query from the first DNS server and extracting user information included in the domain name query;
   providing, the first DNS server from the database system, destination path information for the extracted user information and path information of a second DNS server;
   receiving, by the first DNS server, the destination path information corresponding to the domain name query of the client apparatus and the path information of the second DNS server;
   transmitting the received destination path information and the received path information of the second DNS server with the first DNS server to the client apparatus;
   receiving, by the client apparatus, the destination path information and the path information of the second DNS server from the first DNS server;
   storing, with the client apparatus, the path information of the second DNS server;
   outputting, by the client apparatus, a subsequent domain name query including user information to the first DNS server; and
   outputting, by the client apparatus, a domain name query to the second DNS server by using the stored path information of the second DNS server when the first DNS server cannot operate due to an external attack or operation failure for the subsequent domain name query, wherein the path information of the second DNS server is not published, and is assigned by the database system differently for each received user information.

8. The method of claim 7, wherein the providing of the destination path information comprises:
   providing the first DNS server with path information of a proxy for the extracted user information,
   wherein the proxy whose server information is not published, is used instead of the first DNS server in a case the first DNS server cannot operate due to an external attack or operation failure for the subsequent domain name query.

9. The method of claim 7, wherein a proxy receives the subsequent domain name query from the agent and transmits the subsequent domain name query to the second DNS server, and
   wherein the proxy whose path information is assigned differently for each user information, exists on a path of the second DNS server.

10. The method of claim 7, wherein the database system receives the domain name query from the first DNS server, extracts the user information included in the received domain name query, stores destination path information for each received user information, and provides the first DNS server with destination path information for the extracted user information and path information of the second DNS server,
   wherein the path information of the second DNS server is not published, and is assigned differently for each received user information.

\* \* \* \* \*